United States Patent [19]

Suffi et al.

[11] 4,390,744
[45] Jun. 28, 1983

[54] FIXED COUNT TERMINAL

[75] Inventors: Louis Suffi, Westchester; James E. Golden, Evanston; Frederick W. Burtelson, Harvard, all of Ill.

[73] Assignee: Northern Telecom, Inc., Nashville, Tenn.

[21] Appl. No.: 215,708

[22] Filed: Dec. 12, 1980

[51] Int. Cl.[3] .................... H02G 7/08; H02G 15/113; H02G 15/117; H01R 9/00
[52] U.S. Cl. ........................................ 174/41; 174/59; 174/93
[58] Field of Search ...................... 174/41, 44, 59, 60, 174/72 R, 78, 88 R, 92, 93

[56] References Cited

U.S. PATENT DOCUMENTS

| 1,308,830 | 7/1919 | Ziegler | 174/59 |
| 1,748,536 | 2/1930 | Borden | 339/251 |
| 3,144,500 | 8/1964 | Schreyer | 174/41 |
| 3,153,693 | 10/1964 | Baxter et al. | 174/41 X |
| 3,499,972 | 3/1970 | Smith | 174/88 R |
| 3,654,584 | 4/1972 | Gillemot et al. | 174/78 X |
| 3,676,836 | 7/1972 | Gillemot et al. | 174/78 X |
| 3,701,835 | 10/1972 | Eisele et al. | 174/41 |
| 3,778,749 | 12/1973 | Kapell | 174/78 X |
| 3,836,696 | 9/1974 | Gressitt et al. | 174/41 |
| 3,846,575 | 11/1974 | Troy | 174/41 |
| 4,260,848 | 4/1981 | Amaya | 174/41 |

FOREIGN PATENT DOCUMENTS 823804 9/1969 Canada .................. 174/41

Primary Examiner—Laramie E. Askin
Attorney, Agent, or Firm—Mason, Kolehmainen, Rathburn & Wyss

[57] ABSTRACT

A fixed count terminal provides an enclosed housing for the connection of service wires to telephone conductors contained in a communication cable. The fixed count terminal has a support bracket which is clamped to a support strand portion of the communication cable with a mounting bar extending between the points whereat the support bracket is clamped to the support strand. A cable portion of the communication cable is clamped to the support bracket by Z-shaped brackets and ground clamps and a tension bar extends between the Z brackets. A barrier wall divides the fixed count terminal into terminal and cable compartments and has a plurality of breakaway partitions which can be removed so that terminal modules may be positioned on the barrier wall. A base is also secured to the support bracket at the bottom of the barrier wall and has grommeted openings through which the service wires may be extended into the fixed count terminal and coupled to conductors in the communication cable via the terminal modules. Terminal and cable side covers are hingedly mounted on the base and enclose respectively the terminal and cable sides of the fixed count terminal. A nozzle is located at both ends of the fixed count terminal with each nozzle forming the entrance for the communication cable into the fixed count terminal. In an alternate embodiment, an auxiliary cable may be clamped to the support bracket by a Z-shaped bracket so that conductors within the branch cable also can be coupled to the conductors in the communication cable.

47 Claims, 18 Drawing Figures

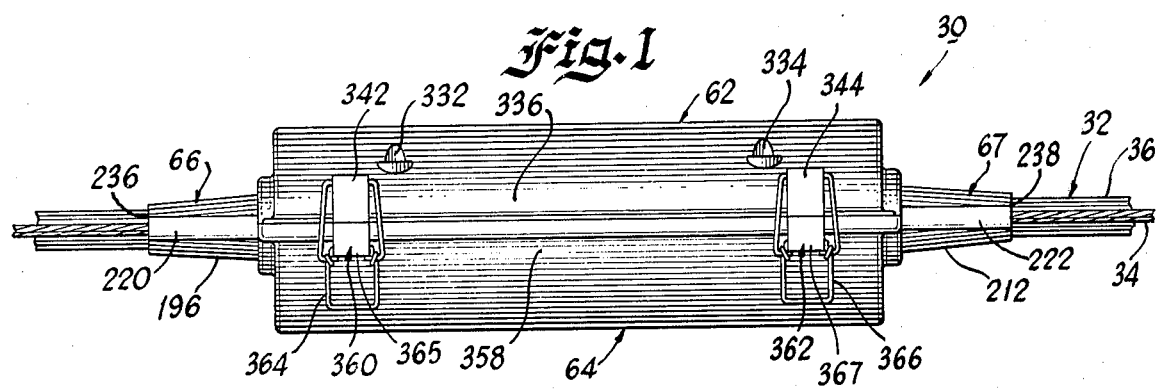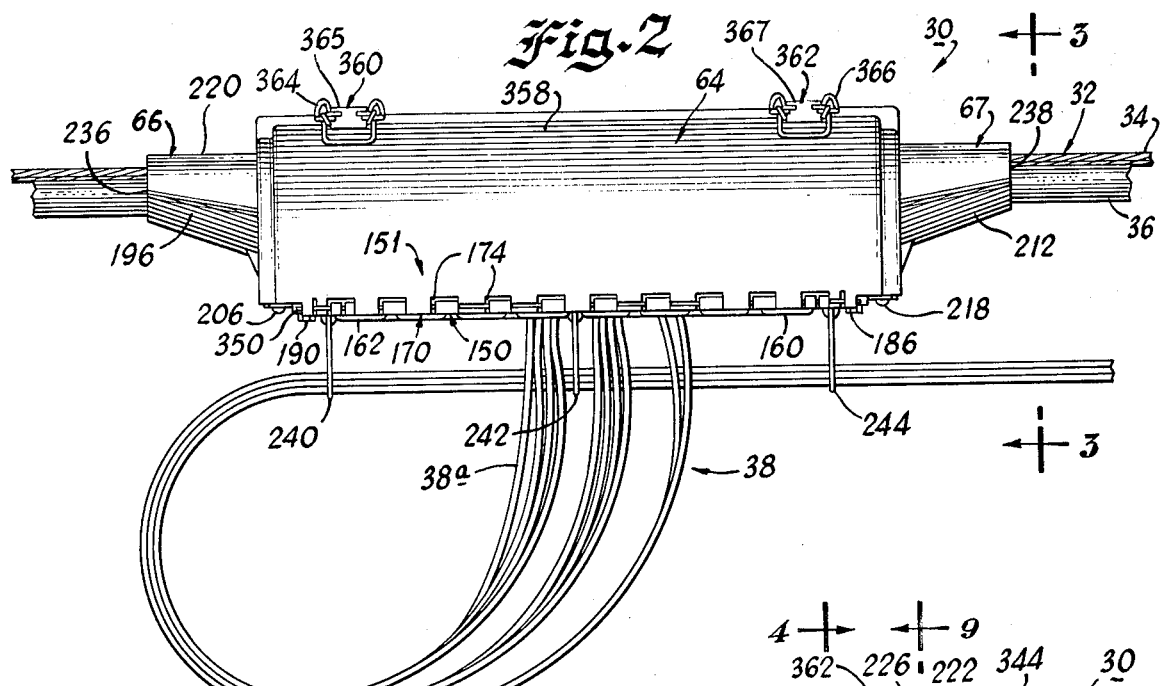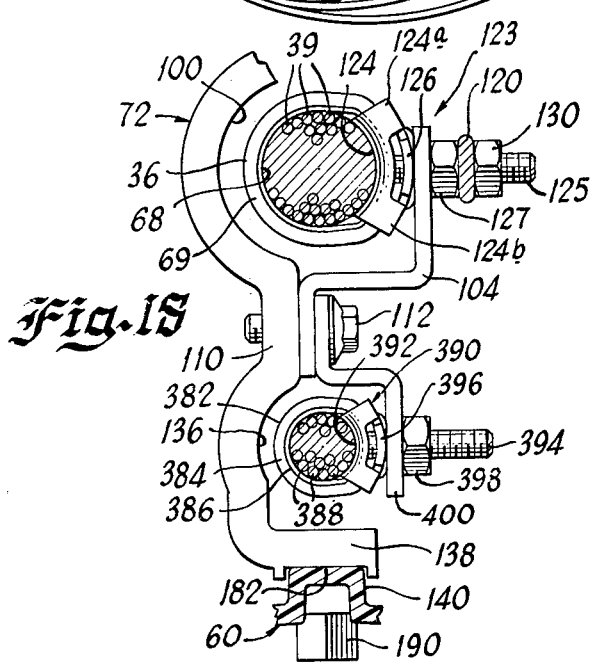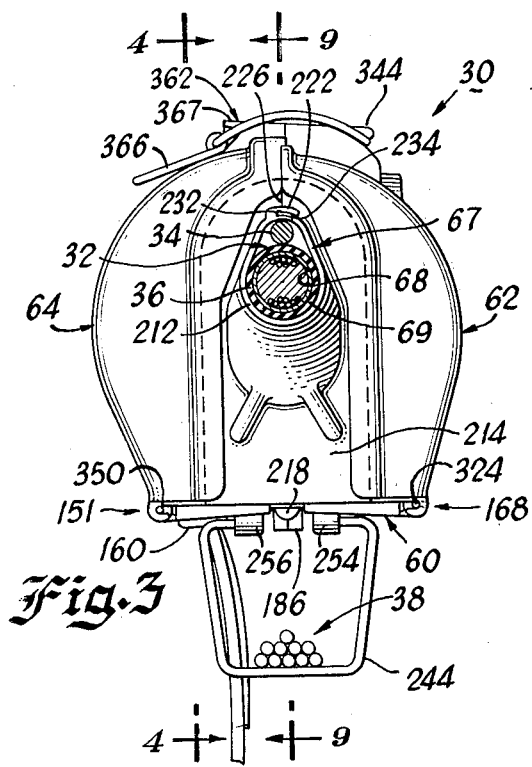

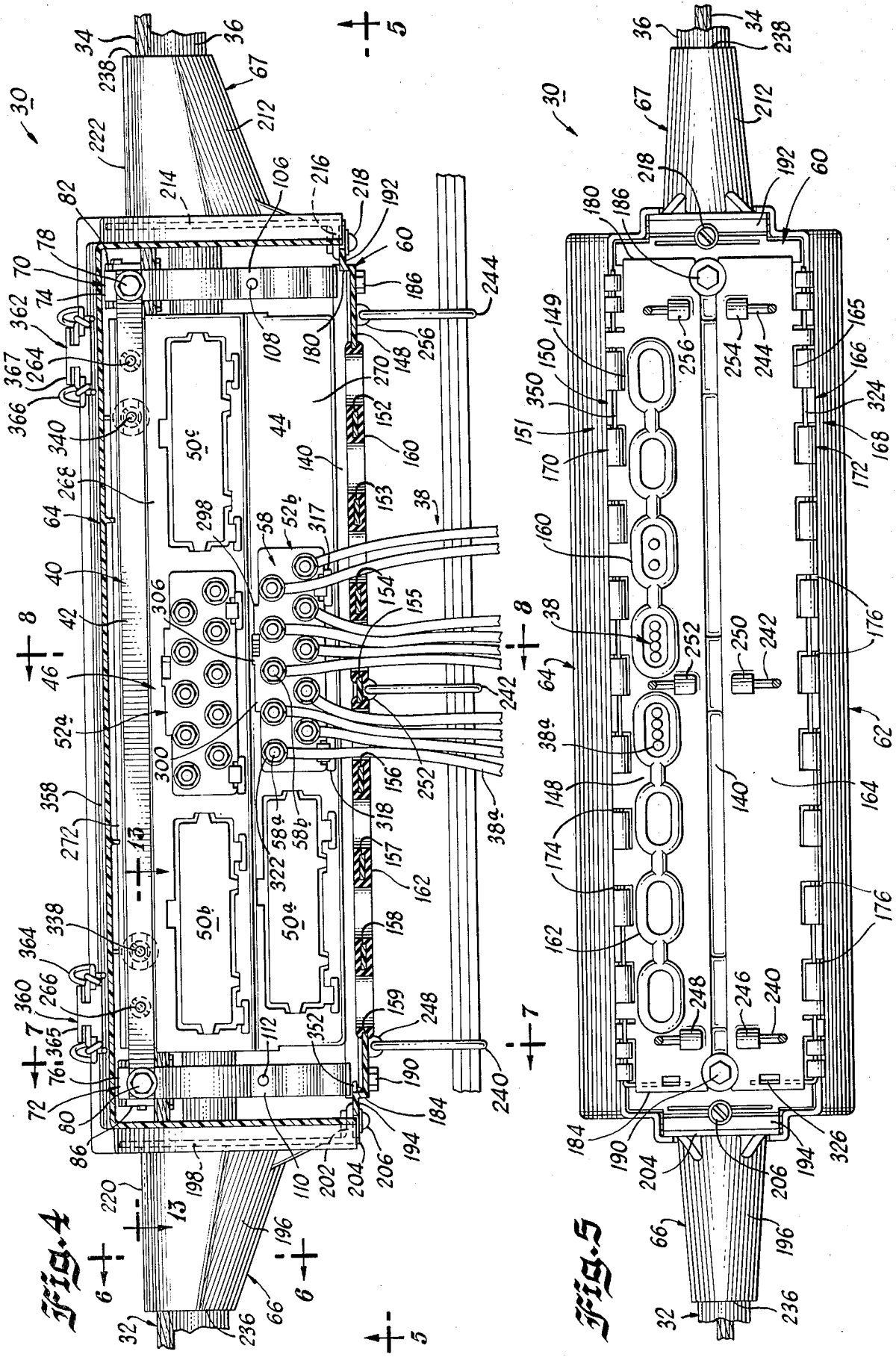

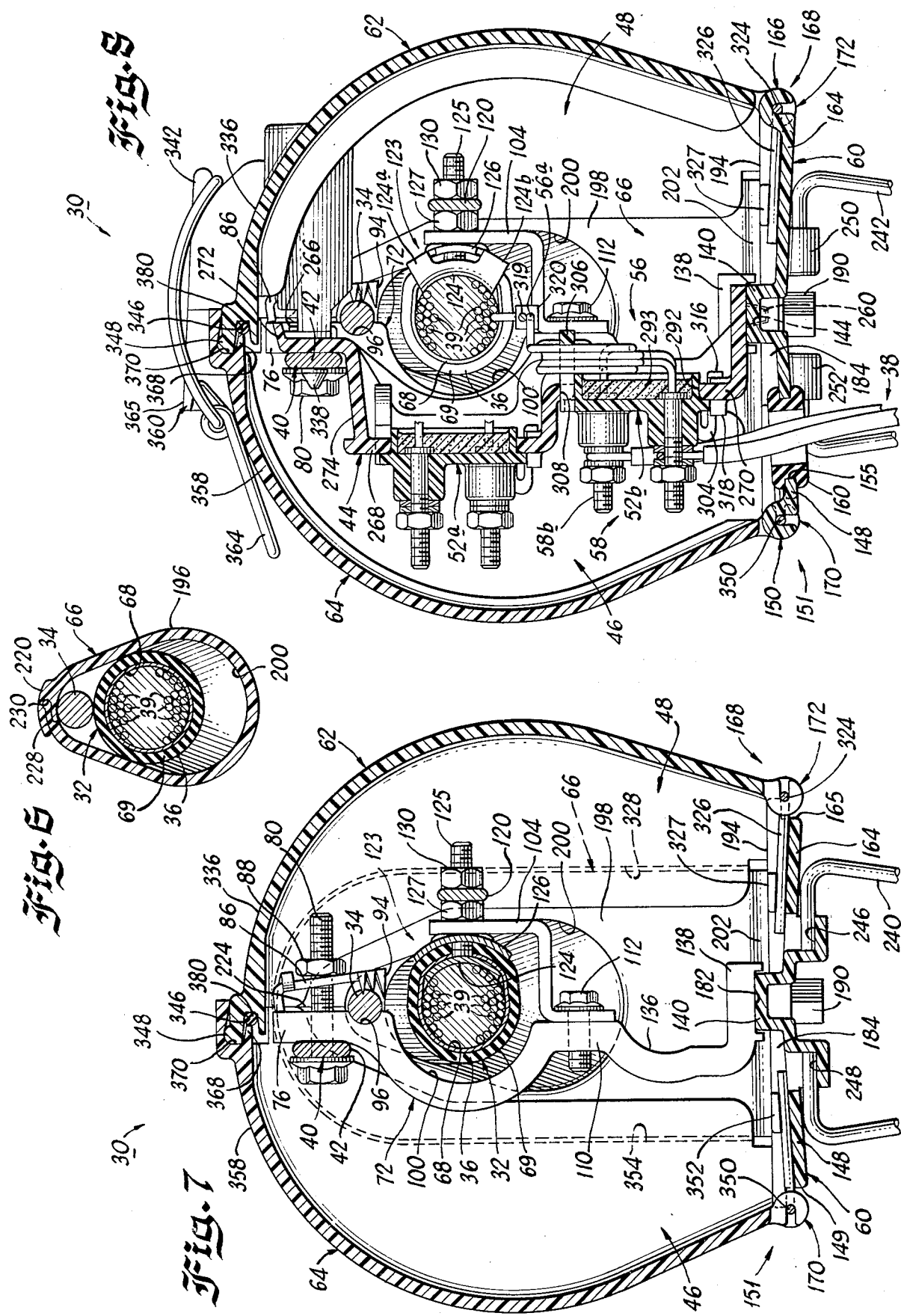

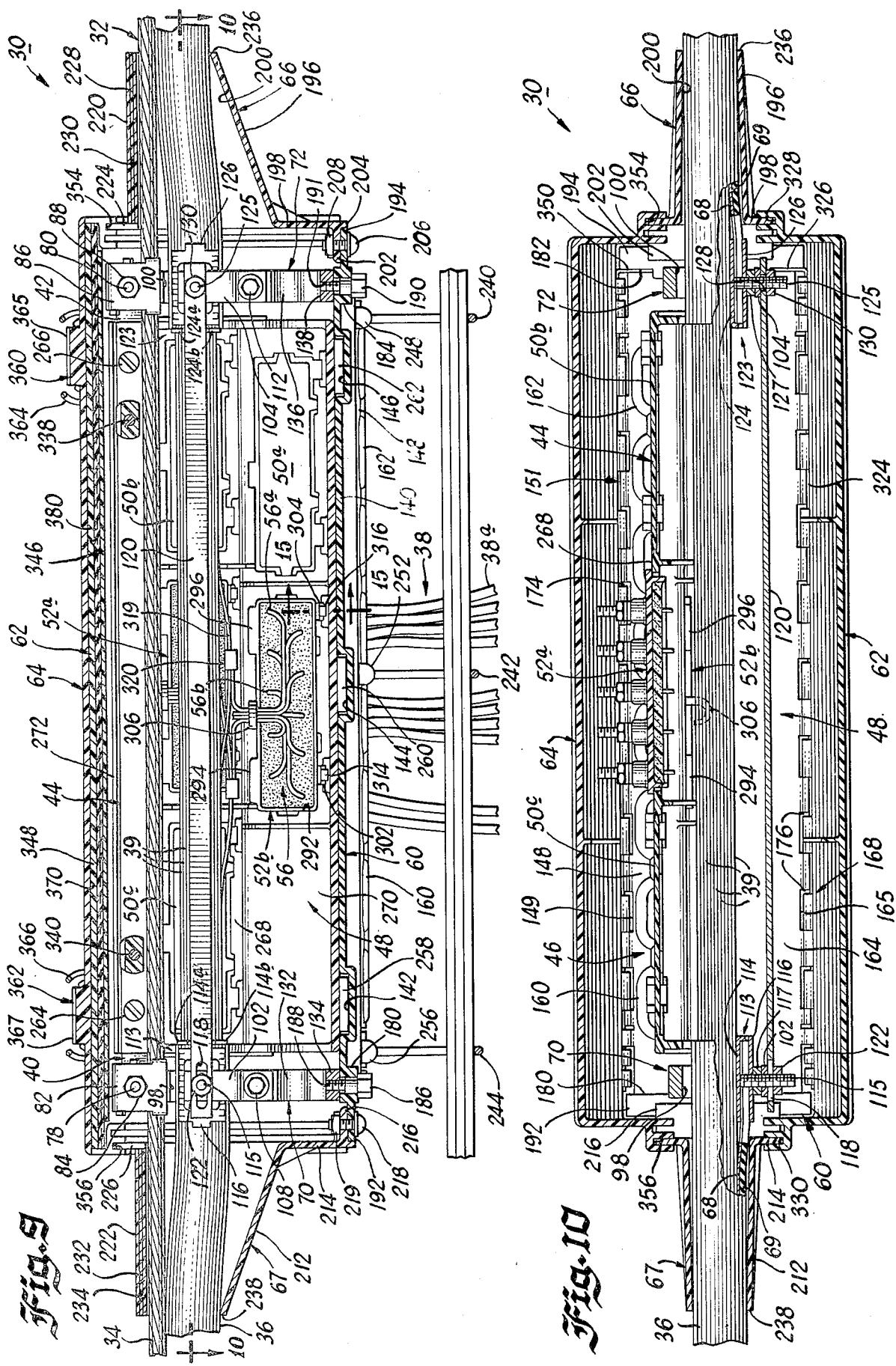

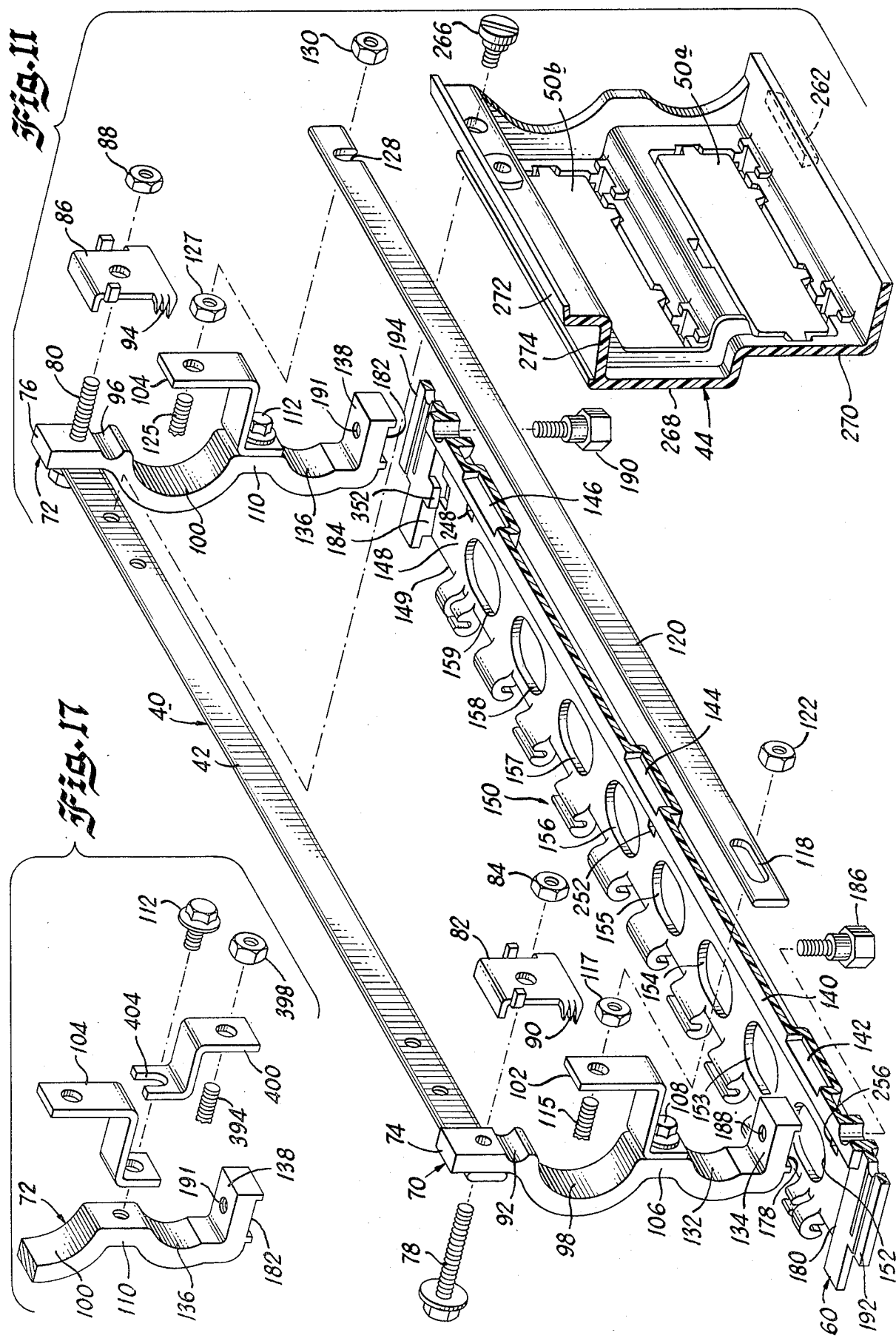

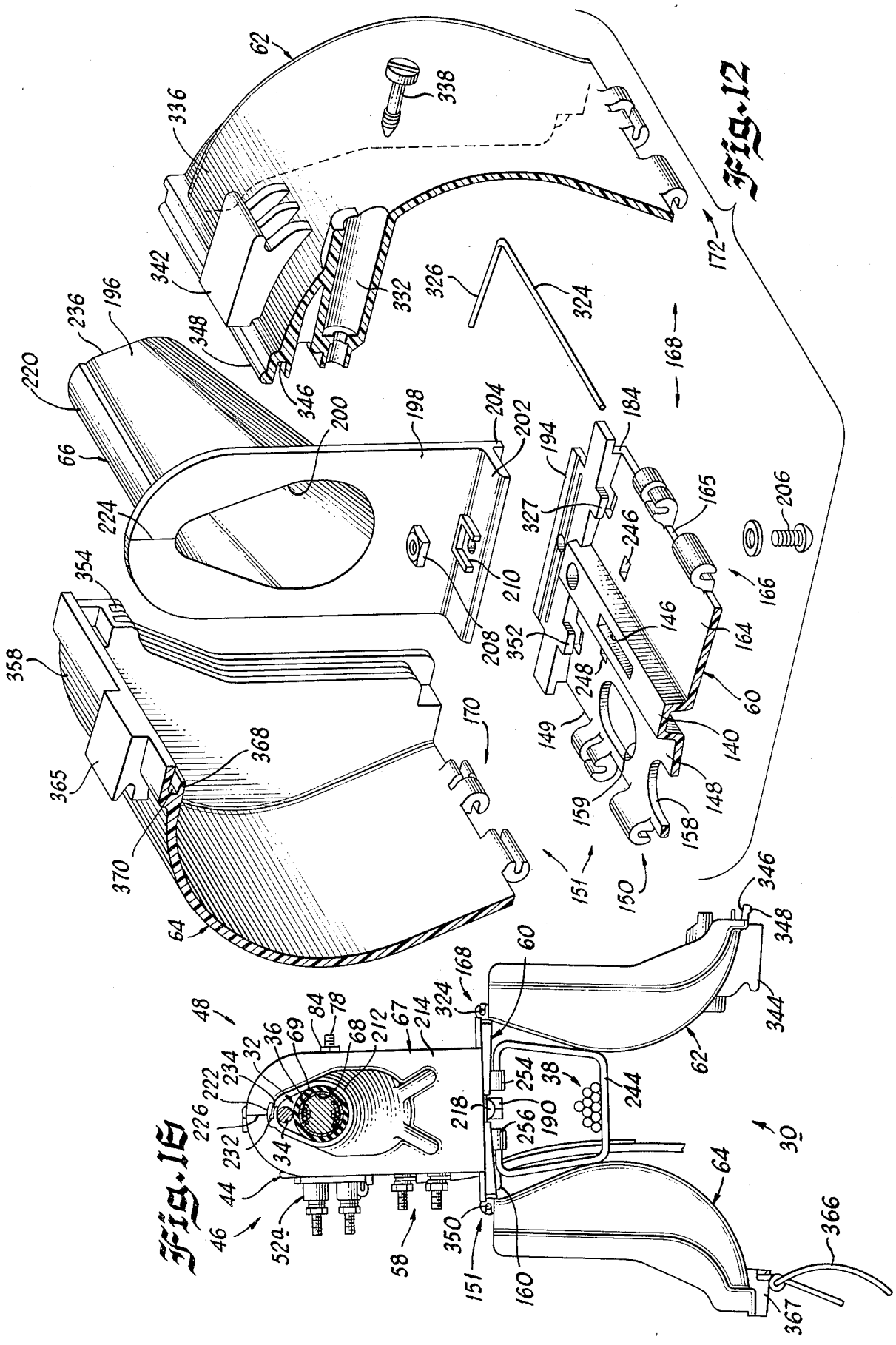

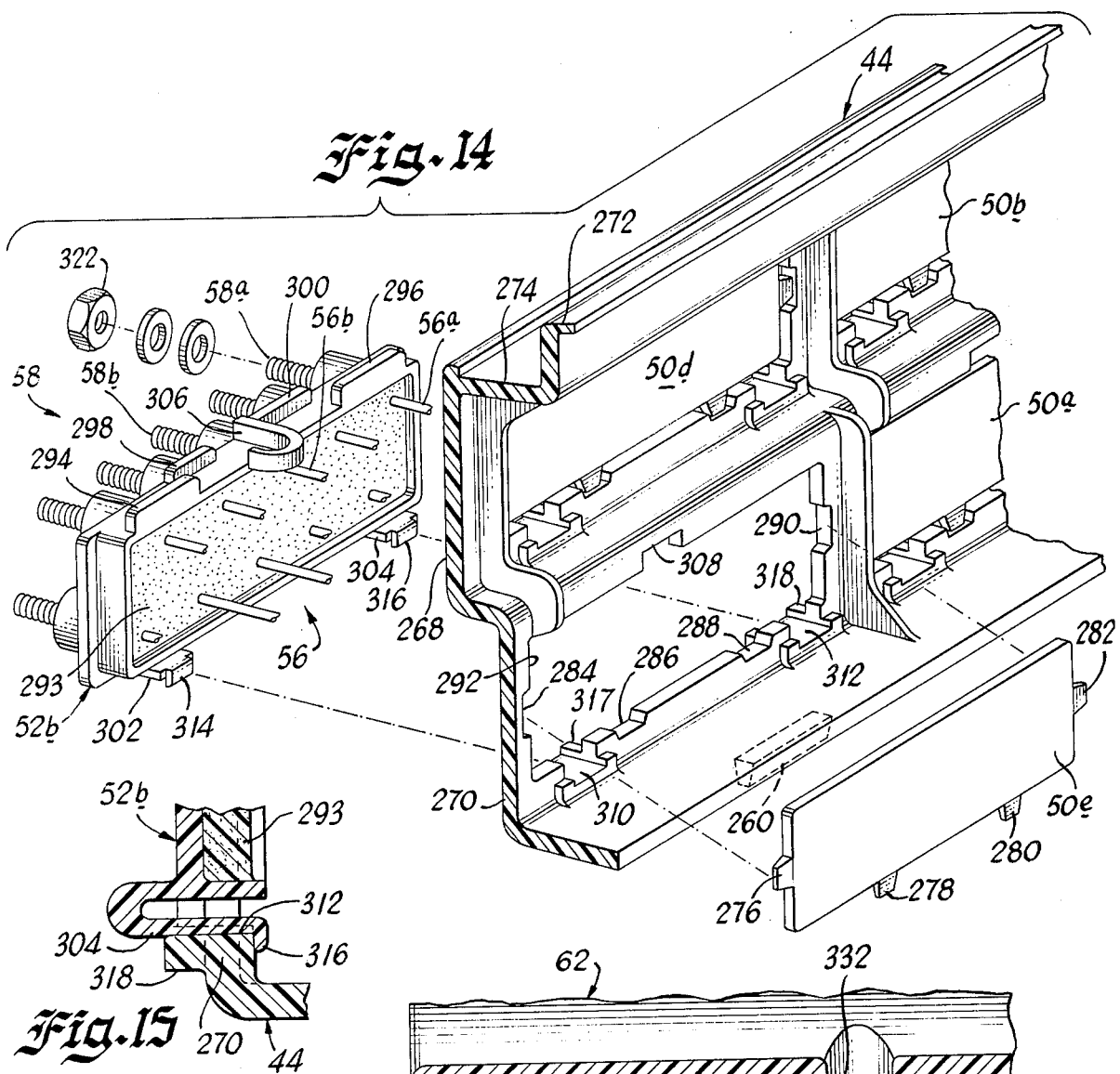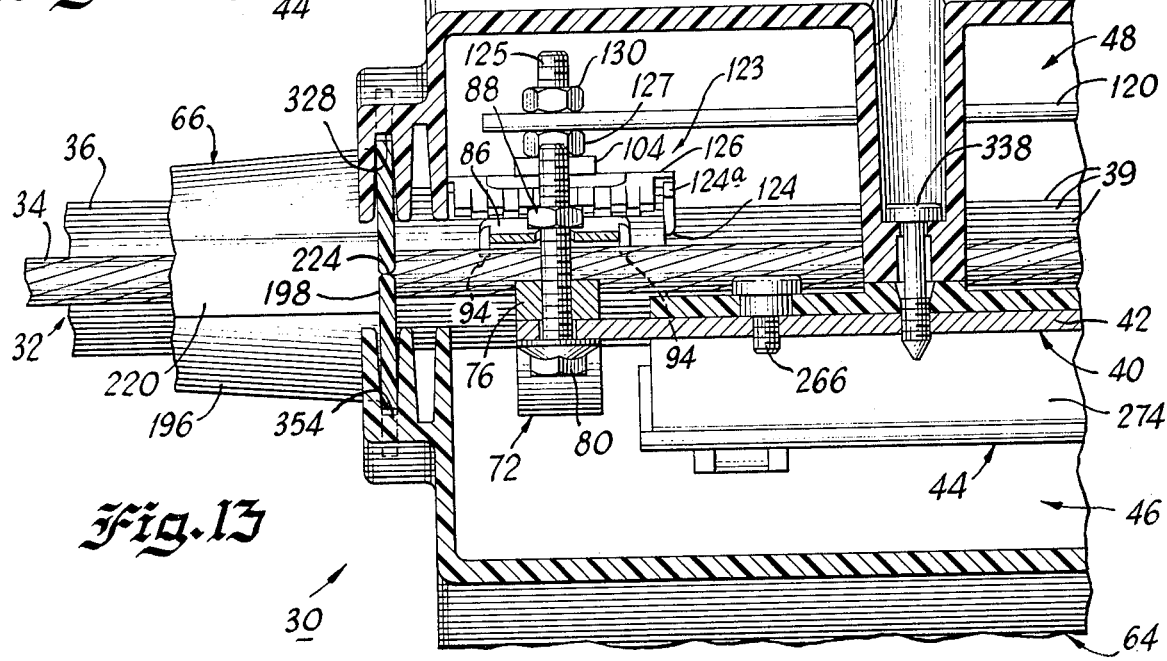

FIXED COUNT TERMINAL

The present invention relates to a fixed count terminal for telephone lines or communication cables, and more particularly, to a new and improved fixed count terminal to be mounted on a communication cable so that the connections of service wires to telephone conductors within the communication cable may be done by the proper telephone personnel in a housing having two separate compartments.

Each telephone set including all the extensions of the same telephone number at a remote location must be coupled through a pair of telephone conductors or wires to a telephone central office. In many instances, a multiplicity of pairs of insulated telephone conductors or wires (for example, 100 pairs) are grouped together in an insulated communication cable which is suspended from telephone poles so that service wires can be coupled to the telephone conductors at various locations remote from the telephone central office. This type of multi-conductor communication cable normally includes two portions. One portion is an insulated conductor cable containing the insulated telephone conductors (sometimes referred to as the cable core) enclosed in an inner metallic shield and an outer insulating sheath. The other portion of the communication cable is a support strand. This strand can have the insulated conductor cable lashed to it by appropriate lashing wire. Alternately, the communication cable can be of the integrated type with the support strand and the insulated conductor cable contained in a continuous common extruded insulating jacket such that the communication cable in cross section is in a figure eight type of configuration with a web of insulating material interconnecting the support strand and the conductor cable.

In order to couple the pairs of telephone wires within the communication cable to a telephone set at a remote location, such as at a house, service or drop wires are used which extend from the cable to the premises where the individual telephone set is located. The connection of the drop wires to the individual pairs of wires within the insulated cable of the communication cable can be accomplished in an aerial type of enclosure which is mounted on or supported by the support strand portion of the communication cable. These types of aerial enclosures have commonly been referred to as ready access closures or aerial terminals because they permit a serviceman access to the telephone conductors within the insulated conductor cable when the drop or service wires need be connected to the conductors and provide a certain amount of protection from the environment for these connections. In a ready access closure, personnel have access to both the service wires extending into the closure and the conductors contained within the cable core after the jacket, including the outer insulating sheath and the inner metallic shield, has been removed. On the other hand, a fixed count type of terminal is designed so that the exposed cable core is somehow separated from the service wires. As a result, in such terminals a lesser trained installer or the like would not have ready access to the conductors in the communication cable.

When a ready access closure or fixed count terminal is to be mounted on a communication cable, a portion of the outer insulating sheath of the conductor cable must be stripped away and in the case of the integrated cable, the web interconnecting the conductor cable and the support strand must also be severed. In addition, the inner metallic shield of the conductor cable is removed from that portion of the cable such that the individual telephone conductors within the insulated cable are exposed and the connection to the drop wires may be made. Even though the outer insulating jacket or sheath and the inner metallic shield are severed for a required distance along the communication cable, the closure or terminal must be designed to maintain the continuity of the shield when it is mounted over the exposed area of the communication cable.

Different types of ready access closure or fixed count terminals are disclosed in U.S. Pat. Nos. 3,153,693; 3,499,972; 3,701,835 and 3,846,575. The ready access closures disclosed in these patents have the disadvantage that a relatively unskilled serviceman or telephone installer has direct access to the telephone conductors within the insulated cable portion of the communication cable when service or drop wires are being coupled to the telephone conductors. Such installers may not be as skilled as the linemen or construction worker who installs the cable closure on the communication cable. As a result, the ready access closure can become so overcrowded and unmanageable that the inside of the closure is a "rats nest" of tangled wires and an installer who later needs to make connections in the closure can easily unintentionally disrupt the connection to one or more other previously connected telephone services when making such additional connections. Moreover, there is a tendency for personnel to inappropriately tamper with conductors in the cable. For instance, when one pair of conductors is defective, an installer might make the service wire connection to other conductors in the cable which are not supposed to be used in that particular closure rather than finding the cause of the defect.

While some of the previously designed fixed count terminals do attempt to isolate the connections of the service wires to the telephone conductors in the communication cable from servicemen or installers, they do not accomplish this by providing a fixed count terminal which is divided into two distinct sections or compartments (one section for the communication cable and the other section for the service wires), access to which sections are through separate covers or doors so that it is difficult for unauthorized personnel to obtain access to the conductors in the communication cable.

Another disadvantage of previously designed fixed count terminals are the ground support or clamp structures used to secure the fixed count terminal to the communication cable. For instance, some of the clamps used in ready access closures or fixed count terminals are described in U.S. Pat. Nos. 1,748,536; 3,144,500; 3,654,584; 3,778,749 and 3,676,836. However, these clamps do not provide structure for easily mounting the ground support structure to the cable, particularly when there is some variance in the position of the clamp used with the cable and do not provide for a quick and effective restoration of the shield continuity after a portion of the shield is stripped away to reveal the core of conductors in the communication cable.

Accordingly, objects of the present invention are to provide a new and improved fixed count terminal that provides a housing in which service wires may be connected to telephone conductors contained in a communication cable and which protects such connections from the environment; to provide a new and improved fixed count terminal which has a modular design concept of having terminal modules acting as interfaces between the telephone conductors in the communication cable and the service wires so that the fixed count terminal can be readily modified to accommodate different numbers of service wire connections; to provide a new and improved fixed count terminal which provides a barrier wall within the terminal on which terminal modules can be mounted and divides the fixed count terminal into terminal and cable compartment sides so that a serviceman or installer does not have access to the connections made to the telephone conductors within a communication cable on the cable side of the fixed count terminal; to provide a new and improved fixed count terminal that has a rigid type of housing which is configured to minimize disturbances by the wind or the like; to provide a new and improved fixed count terminal that is designed to permit the housing to be ventilated and to permit the drainage of moisture from within the housing; to provide a new and improved fixed count terminal that has terminal modules which are readily mounted on a barrier wall in the fixed count terminal and which are used to connect service wires to the telephone conductors within a communication cable; to provide a new and improved fixed count terminal which has a cable side and a terminal side with a separate cover for each side so that a serviceman need only to obtain access to the terminal side in order to make the service wire connections; to provide a new and improved fixed count terminal in which the covers or doors covering the cable side and the terminal side of the fixed count terminal are hingedly mounted to the fixed count terminal so that they can be moved out of the way and do not obstruct the work being done on a fixed count terminal by a serviceman or lineman, but at the same time remain attached to the fixed count terminal; to provide a new and improved fixed count terminal having a ground support structure which readily and easily is attached to a communication cable and by which the fixed count terminal is supported relative to the communication cable; to provide a new and improved fixed count terminal having a support structure utilizing Z-brackets to position the insulated conductor cable portion of a communication cable relative to the fixed count terminal and to be used in quickly and easily restoring the shield continuity of the shield in the communication cable; to provide a new and improved fixed count terminal having improved pull-out strength and enhanced current paths through the grounding arrangement and to provide a new and improved fixed count terminal having a ground support structure by which branch cables may be easily affixed relative to the fixed count terminal by additional Z brackets.

In accordance with these and many objects of the present invention, an embodiment of the present invention comprises a fixed count terminal which provides an enclosed housing about a portion of a communication cable which has had an outer insulating sheath and an inner metallic shield of an insulated conductor portion of the cable removed for a short distance along the length of the cable to expose a portion of the telephone conductors contained within the insulated conductor so that service or drop wires may be coupled to the telephone conductors. The fixed count terminal has a mounting or support bracket clamped on both sides of the exposed telephone conductors to a support strand portion of the communication cable with a mounting bar extending between the points whereat the support bracket is clamped to the support strand. A barrier wall is attached to the mounting bar to divide the fixed count terminal into the terminal and cable sides with the communication cable being clamped to the support structure on the cable side of the barrier wall by appropriate Z-shaped brackets. The barrier wall has a plurality of openings so that the service wires which extend into the terminal side of the fixed count terminal can be coupled via terminal modules to the telephone conductors. In the preferred embodiment, breakaway partitions or knock-out portions are provided such that when they are removed, terminal modules may be snapped into place on the barrier wall. Each of the terminal modules acts as an interface between a certain number of service wires and telephone conductors (for example, each terminal module can act as an interface for five pairs of service wires and telephone conductors) and has connecting wires extending from the cable side of the barrier wall. The connecting wires are adapted to be coupled to the telephone conductors in the communication cable by appropriate connectors and are coupled to terminals extending from the terminal side of the terminal module so that when service wires are attached to the terminals, they are also coupled via the connecting wires to the telephone conductors.

A base is also connected to the support bracket and has recesses to receive projections extending from the lower part of the barrier wall that serve to align and stabilize the barrier wall within the fixed count terminal. The base has grommets inserted in openings located on the terminal side of the barrier wall. Telephone service wires are extended through the grommets so that they can be coupled to the terminals on the terminal modules. The telephone service wires are held in position below the base by wire rings pivotally mounted on the outer lower side of the base. A cable side cover or door is hingedly mounted along one edge of the base and covers the cable side of the fixed count terminal when it is locked in a closed position by screws extendable into the mounting bar. A terminal side door or cover is also hingedly mounted to an opposite edge of the base and covers the terminal side of the fixed count terminal when maintained in its closed position by a latch mechanism secured to the cable side cover. A nozzle assembly is attached to the base at each end of the housing and provides an entrance for the communication cable to the inside of the fixed count terminal. In an alternate embodiment of the fixed count terminal of the present invention, an auxiliary cable may be clamped to one of the support brackets by appropriate Z-brackets on the cable side of the barrier wall. In such an embodiment, one of the nozzle assemblies is replaced with a branch nozzle assembly which provides not only an entrance for the communication cable extending through the fixed count terminal but also the branch or auxiliary cable.

Many other objects and advantages of the present invention will become apparent from the following detailed description in conjunction with the following drawings:

FIG. 1 is a top elevation view of the fixed count terminal embodying the present invention;

FIG. 2 is a side elevation view of the terminal side of the fixed count terminal of FIG. 1;

FIG. 3 is a cross-sectional view of the fixed count terminal of FIG. 2 taken along line 3—3 of FIG. 2;

FIG. 4 is a cross-sectional view of the fixed count terminal of FIG. 3 taken along line 4—4 of FIG. 3;

FIG. 5 is a cross-sectional view of the fixed count terminal of FIG. 4 taken along line 5—5 of FIG. 4;

FIG. 6 is a cross-sectional view of the fixed count terminal of FIG. 4 taken along line 6—6 of FIG. 4;

FIG. 7 is a cross-section view of the fixed count terminal of FIG. 4 taken along line 7—7 of FIG. 4;

FIG. 8 is a cross-sectional view of the fixed count terminal of FIG. 4 taken along line 8—8 of FIG. 4;

FIG. 9 is a cross-sectional view of the fixed count terminal of FIG. 3 taken along line 9—9 of FIG. 3;

FIG. 10 is a cross-sectional view of the fixed count terminal of FIG. 9 taken along line 10—10 of FIG. 9;

FIG. 11 is an exploded, partially cut away perspective view of the support bracket, the base and the barrier wall portions of the fixed count terminal embodying the present invention;

FIG. 12 is an exploded, partially cut away perspective view of a portion of the base, the cable and terminal side covers and one end nozzle of the fixed count terminal embodying the present invention;

FIG. 13 is a partial cross-sectional view of the fixed count terminal of FIG. 4 taken along line 13—13 of FIG. 4;

FIG. 14 is an exploded, partially cut away perspective view of a barrier wall mounted within the fixed count terminal embodying the present invention with one terminal module mounted thereon;

FIG. 15 is a partial cross-section view of the fixed count terminal of FIG. 9 taken along line 15—15 of FIG. 9;

FIG. 16 is a cross-sectional view of the general type shown in FIG. 3 of the drawings but with the cable and terminal side covers in their open position;

FIG. 17 is an exploded, partially cut away perspective view of a portion of a support bracket disclosing a cable bracket used in clamping an auxiliary cable to the support bracket; and FIG. 18 is a partial cross-sectional view similar to that of FIG. 7 dislosing the manner in which an auxiliary cable is mounted in the fixed count terminal embodying the present invention.

Referring now more specifically to FIGS. 1 and 2 of the drawings, therein is disclosed a fixed count terminal which is generally designated by the numeral 30 and which embodies the present invention. The fixed count terminal 30 is designed to be mounted on a communication cable 32 which includes a support strand 34 and an insulated conductor cable 36. The fixed count terminal 30 when mounted on the communication cable 32 provides a housing for the connection of service wires 38 to telephone conductors 39 located in the insulated conductor cable portion 36 of the communication cable 32.

As is more particularly seen in FIGS. 4–10 of the drawings, the fixed count terminal 30 is supported on the communication cable 32 and particularly the support strand 34 by a support bracket 40 which includes a mounting bar 42 and which is clamped at both ends of the fixed count terminal 30 to both the support strand 34 and the insulated conductor cable 36. A barrier wall 44 is fastened to the mounting bar 42 and divides the fixed count terminal 30 into two sides or sections, one being a terminal side or section 46 and the other being a cable side or section 48. The barrier wall 44 has a number of breakaway partitions or knock-out portions 50a, 50b, 50c, 50d and 50e. When a knock-out portion, such as the knock-out portion 50e (see FIG. 14), is removed from the barrier wall 44, an opening is provided in the barrier wall 44 for a terminal module, such as the terminal modules 52a and 52b, to be snapped into position in the opening in the barrier wall 44. The terminal modules 52a and 52b act as interfaces between certain of the service wires or drop wires 38 and certain ones of the insulated telephone conductors 39 contained within the insulated conductor cable 36. As best can be seen in FIGS. 9, 10 and 14, the terminal modules 52a and 52b have a plurality of connecting wires 56 which extend into the cable side 48 and each of which can be connected to individual ones of the telephone conductors 39. The terminal modules 52a and 52b also have a plurality of terminals 58, which extend into the terminal side 46 of the fixed count terminal 30 and each of which is adapted to be coupled to individual ones of the service wires 38.

The bottom portion of the fixed count terminal 30 is formed by a base 60 which is fastened to the support bracket 40 and interlocked with the barrier wall 44. The base 60 also provides an entrance for the service wires 38 into the terminal side portion 46 of the interior of the fixed count terminal 30. A cable side cover or door 62 is hingedly mounted to the base 60 so that when it is in its closed position, as, for instance, shown in FIG. 1, the cover 62 encloses the cable side 48 of the fixed count terminal 30. Similarly, a cover or door 64 is hingedly mounted to the base 60 and when it is in its closed position, it covers or encloses the terminal side 46 of the fixed count terminal 30. Entrance nozzles 66 and 67 are provided in openings formed by the closed doors 62 and 64 and the base 60 at the ends of the fixed count terminal 30 and provide the entrances to the fixed count terminal 30 for the communication cable 32.

The communication cable 32 consists of two main components. One component is the support strand 34 and the other component is the insulated conductor cable 36. The support strand 34 supports the weight of the communication cable 32 and can be made of a plurality of steel strands or the like. The insulated conductor cable 36 can be lashed to the support strand 34 with appropriate lashing wires or the like. Alternately, the support strand 34 and the conductor cable 36 can be of the integrated type in which both the support strand 34 and the insulated conductor cable 36 are contained in a continuous common extruded insulated jacket such that the communication cable 32 in cross section is in a figure eight type of configuration with a web of insulating material interconnecting the support strand 34 and the insulated conductor cable 36.

The insulated conductor cable 36 includes the individual telephone conductors generally designated as 39. These telephone conductors 39 are connected to the service wires 38 so that a telephone set at a remote location can be coupled to a telephone central office. The insulated cable conductor 36 in many instances will contain 25 to 200 pairs or more of telephone conductors 39. The telephone conductors 39 form an inner portion or core of the cable 36 and are surrounded by an inner metallic shield 68. The shield 68 provides a metallic ground to protect the telephone conductors 39. An outer insulating sheath 69 is disposed about the inner metallic shield 68 to provide appropriate insulation for the inner metallic shield 68 and the telephone conductors 39 contained within the conductor cable 36.

In order to mount the fixed count terminal 30 on the communication cable 32, a portion of the insulating sheath 69 and the inner metallic shield 68 is stripped away from the insulated conductor cable 36 so that a portion of the telephone conductors 39 is exposed. For instance, in FIG. 10, a portion of the insulation sheath 69 and the inner metallic shield 68 is shown removed from the cable 36. In addition, if the communication cable 32 is the integrated type, the web interconnecting the support strand 34 to the cable also has to be removed for the length of the fixed count terminal 30. Once the communication cable 32 has been so prepared for the fixed count terminal 30, the fixed count terminal 30 is affixed to the communication cable 32 by means of the support bracket 40.

More specifically, the support bracket 40 includes clamp brackets 70 and 72 which are positioned at the opposite ends of the stripped portion of the communication cable 32 and have the mounting bar 42 extending between them. The clamp bracket 70 has an upstanding end portion 74 at its top end and the clamp bracket 72 has a similar upstanding end portion 76 at its top end. The mounting bar 42 is secured to and between the upstanding end portions 74 and 76 by fasteners 78 and 80, respectively. The fastener or bolt 78 projects through the mounting bar 42, the upstanding portion 74 and a support strand clamp 82 and is secured in place by a nut 84. Similarly, the fastener or bolt 80 projects through the mounting bar 42, the upstanding portion 76 and a support strand clamp 86 and is maintained in position by a nut 88.

The support strand clamp clamps 82 and 86 are used to clamp the support strand 34 of the communication cable 32 to the clamp brackets 70 and 72. As more particularly seen in FIGS. 7-9 and 11 of the drawings, the clamp 82 has gripping teeth 90 which bite into the strand 34 so as to hold the strand 34 securely in a notch or arcuate shaped holding portion 92 located on the support bracket 70 just below the upstanding portion 74. The clamp 86 likewise has gripping teeth 94 which bite into the strand 34 adjacent the clamp bracket 72 so as to hold the strand 34 securely in a notch or arcuate shaped holding portion 96 located on the support bracket 72 just below the upstanding portion 76. The securing of the support strand 34 to the clamp brackets 70 and 72 by the clamps 82 and 86, respectively, also electrically couples the support strand 34 to the clamp brackets 70 and 72 so that the clamp brackets 70 and 72 and hence the support bracket 40 remain at ground potential because the support strand 34 is maintained at ground or reference potential.

The clamp bracket 70 also includes an arcuate shaped cable holding or receiving portion 98 and the clamp bracket 72 includes a similar arcuate shaped cable holding or receiving portion 100. The cable holding portions 98 and 100 are adapted to have the insulated conductor cable 36 positioned therein when the support bracket 40 is secured to the communication cable 32. The cable 36 is maintained in position within the cable holding portions 98 and 100 by generally Z-shaped brackets 102 and 104, respectively. As is particularly seen in FIGS. 7, 8, 11 and 13 of the drawings, the Z-bracket 102 is attached at its lower end to a mid-section 106 of the clamp bracket 70 by a fastener or bolt 108 and the Z-bracket 104 is attached at its lower end to a mid-section 110 of the clamp bracket 72 by a fastener or bolt 112.

A shield bonding clamp 113 is used to secure the cable 36 to the Z-bracket 102 so as to position the cable 36 in the cable holding portion 98. The shield bonding clamp 113 has an inner plate 114 and is inserted between the inner metallic shield 68 and the core of conductors 39 of the cable 36 adjacent the clamp bracket 70 until tabs 114a and 114b on the inner plate 114 abut against the severed edges of the outer insulating sheath 69 such that the inner plate 114 is in electrical contact with the inner metallic shield 68. A threaded stud 115 extending from the inner plate 114 projects through an outer plate 116 of the shield bonding clamp 113 and through an upper leg of the Z-bracket 102 and is secured to the Z-bracket 102 by a nut 117. The outer portion of the stud 115 also projects through a slot 118 in a tension bar 120 and is secured in position by a nut 122. Similarly, a shield bonding clamp 123 is positioned at the other end of the stripped area of the communication cable 32 to hold the cable 36 in the cable holding portion 100. The shield bonding clamp 123 has an inner plate 124 inserted between the inner metallic shield 68 and the core of conductors 39 of the conductor cable 36 so that tabs 124a and 124b on the inner plate 124 abut against the severed edge of the outer sheath 69. A threaded stud 125 extends from the inner plate 124 and projects through the outer sheath 69 to an outer plate 126 of the shield bonding clamp 123 and Z-bracket 104. The stud 125 is held in position in the Z-bracket 104 by a nut 127 secured on the stud 125. The stud 125 also projects through a notch 128 at the other end of the tension bar 120 and is secured in position by a nut 130. As a result, the conductor cable 36 of the communication cable 32 is maintained securely in position within the arcuate holding portions 98 and 100 by the Z-brackets 102 and 104, respectively.

Since the Z-bracket 102 is mounted to the midsection 106 of the clamp bracket 70 by the bolt 108, it can be rotated about the bolt 108 when the bolt 108 is loosened so that the stud 115 extending from the inner plate 114 can more easily be positioned through the Z-bracket 102. Once the shield bonding clamp 113 is so attached to the Z-bracket 102, the bolt 108 may be tightened to securely fasten the Z-bracket 102 in place. Likewise, the Z-bracket 104 may be rotated about the fastener 112 so as to facilitate the connection of the shield bonding clamp 123 to the Z-bracket 104.

Once the inner metallic shield 68 is removed from a portion of the cable 36, the continuity of the inner metallic shield 68 is severed and it is desirable to restore the continuity of the shield 68 as soon as possible. Since the Z-brackets 102 and 104 are each connected to the inner metallic shield 68 through the shield bonding clamps 113 and 123, a ground path is formed between the severed inner metallic shield 68 through the inner plate 114, the stud 115, the Z-bracket 102, the clamp bracket 70, the mounting bar 42, the clamp bracket 72, the Z-bracket 104, the stud 125 and the inner plate 124. Hence, as soon as the severed portions of the inner metallic shield 68 are connected to the support structure 40 by the Z-brackets 102 and 104 and the shield bonding clamps 113 and 123, the continuity of the inner metallic shield 68 is restored.

The tension bar 120 provides an additional electrical path across the opening in the inner metallic shield 68 because the tension bar 120 is also coupled to the Z-bracket 102 by the stud 115 and thereby to the inner plate 114 and to the Z-bracket 104 by the stud 125 and thereby to the inner plate 124. The tension bar 120 also provides the support bracket 40 with additional pullout strength reinforcing that of the mounting bar 42.

The slot 118 and the notch 128 provided in the tension bar 120 enable the tension bar 120 to be rotated about the stud 115 when work is being done in coupling the connecting wires 56 to the telephone conductors 39 by merely loosening the nuts 122 and 130. In this regard, the tension bar 120 is insulated so as to insure that it is not inadvertently grounded to any of the telephone conductors 39. It is noted that even if the tension bar 120 is swung out of the way, the ground path or continuity is still maintained between portions of the inner metallic shield 68 through the mounting bar 42 because it is maintained connected to the clamp brackets 70 and 72 which are coupled to the severed portions of the inner metallic shield 68 by the Z-brackets 102 and 104 respectively.

The clamp brackets 70 and 72 also enable an auxiliary or branch cable to be attached to the support bracket 40. More specifically, the lower portion of the clamp bracket 70 has an arcuate auxiliary holding portion 132 extending between the midsection 106 of the clamp bracket 70 and a bottom leg or base portion 134. Likewise, the clamp bracket 72 has an arcuate shaped auxiliary holding portion 136 extending between the midsection 110 and a leg or base portion 138. As described in more detail hereinafter, a branch cable which is to be coupled to the telephone conductors 39 in the insulated conductor cable 36 may be installed in the fixed count terminal 30 by the positioning of the branch cable in either the holding portion 132 or the holding portion 136.

The base 60 is secured to the leg portions 134 and 138 of the clamp brackets 70 and 72, is made of an appropriate hard insulating material, such as rigid PVC, and has a central raised portion 140 extending along its length with three slots or notches 142, 144 and 146 disposed in the central portion 140. The base 60 has a terminal side base or floor section 148 extending from the central portion 140 toward an elongated edge 149 of the base 60 along which is disposed knuckles 150 which form a part of a hinge assembly 151 for connecting the terminal side cover 64 to the base 60. The terminal side floor section 148 has oval shaped openings 152–159 disposed therein. A grommet assembly 160 is insertable into the openings 152–155 and a grommet assembly 162 is insertable into the openings 156–159. The grommet assemblies 160 and 162 seal the openings 152–159 but at the same time permit service wires 38 to be extended through the openings 152–159 so that the service wires 38 can be coupled to the terminals 58 on the terminal modules 52a and 52b.

The base 60 also includes a cable side floor or base section 164 which extends from the central portion 140 toward an elongated edge 165 along which is disposed knuckles 166 forming a part of a hinge assembly 168 connecting the cable side cover 62 to the base 60. As is particularly seen in FIGS. 7-8 and 12 of the drawings, the floor sections 148 and 164 are sloped or tapered outwardly and downwardly from the central portion 140 of the base 60 toward respectively the edges 149 and 165 so that any moisture within the fixed count terminal 30 will tend to drain downwardly toward the hinge assemblies 151 and 168. The hinge assemblies 151 and 168 are designed such that there are small openings between knuckles 170 on the doors 64 and the knuckles 150 and small openings between knuckles 172 on the door 62 and the knuckles 166 so as to provide drainage for any moisture within the fixed count terminal 30 and so as to ventilate the inside of the fixed count terminal 30 in order to aid in the evaporation of condensate. For example, as can be seen in FIG. 5 of the drawings, there is provided openings 174 along the edge 149 and openings 176 along the edge 165.

As previously indicated, the base 60 is attached to the base portion 134 and 138 of the clamp brackets 70 and 72, respectively. In particular, the base portion 134 has a slot 178 that fits about the central portion 140 of the base 60 near an end 180 of the base 60. Similarly, the base portion 138 of the clamp bracket 72 has a slot 182 which also fits about the central portion 140 of the base 60 at the opposite end 184 of the base 60. A fastener 186 extends through the central portion 140 of the base 60 into a threaded hole 188 in the base portion 134 and a fastener 190 projects through the central portion 140 of the base 60 into a threaded hole 191 of the base portion 138. As a result, the fasteners 186 and 190 secure the base 60 to the clamp brackets 70 and 72 and thereby to the supporting bracket 40.

The end 180 of the base 60 has a ledge or lip portion 192 extending from it. The ledge 192 acts as a support ledge for the mounting of the entrance nozzle 67 to the base 60. Similarly, the base 60 has a support ledge 194 extending from its end 184. The ledge 194 acts as a support ledge for the securing of the entrance nozzle 66 to the base 60. The nozzles 66 and 67 provide entranceways for the communication cable 32 into the fixed count terminal 30. In order to accommodate various sized cables 32, the nozzle 66 has a funnel-shaped nose portion 196 which extends from a wall 198 having an opening 200 which opens into the funnel-shaped nose section 196. A ledge or lip 202 projects from near the bottom of the wall 198 and is designed to fit onto the ledge 194 with a bottom leg or wall portion 204 fitting against the side of the ledge 194. The ledge 202 is secured to the ledge 194 by a fastener 206 which extends through the ledge 194 and the ledge 202 into a nut 208 which is held in position by a U-shaped projection 210 on the ledge 202. Likewise, the nozzle 67 has a funnel-shaped nose section 212 extending from a wall portion 214. The wall 214 has a ledge 216 which fits on the ledge 192 of the base 60. The ledge 216 is secured to the ledge 192 by fastener 218 which extends the ledge 192 and the ledge 216 into a nut 219 held in position on the ledge 216.

The nose sections 196 and 212 are separable along a top portion 220 and 222 respectively. In addition, the wall 198 is separable along a line 224 and the wall 214 is separable along a line 226. Consequently, when a communication cable 32 is to be placed in the nose section 196 and extend through the opening 200 in the wall 198, the nose section 196 can be separated along the top portion 220 and the wall 198 can be separated along the line 224 so that the communication cable 32 can be disposed in the entrance nozzle 66. Similarly, the communication cable 32 can be placed in the nozzle 67 by separating the nose portion 212 at its top end 222 and separating the wall 214 along the line 226. The nose sections 196 and 212 fit together along the top portions 220 and 222, respectively, by the tongue and groove method. More specifically, a tongue 228 snaps into a groove 230 at the top portion 220 of the nozzle 66. As a result, the nozzle 66 is maintained together at the top portion 220 until it is pulled apart for the installation of the cable 32. Likewise, the nozzle 67 has a tongue 232 which fits into a groove 234 at its top end 222.

The fixed count terminal 30 can be used with various sizes of communication cables 32. In order for the entrance nozzle 66 and 67 to essentially act as a seal for the entrance of the communication cable 32 into the fixed count terminal 30, the outer end 236 of the nozzle 66 and the outer end 238 of the nozzle 67 may be cut. The smaller the diameter of the communication cable 32, the less of the outer portions 236 and 238 of the nozzles 66 and 67, respectively, need be cut away. For larger size cables 32 the nose portions 196 and 212 will be severed closer to the upstanding walls 198 and 214, respectively. When the nozzles 66 and 67 are so cut, the ends of the nozzles 66 and 67 with the cable 32 located therein can be taped or the like so as to further seal the entrance of the cable 32 into the fixed count terminal 30.

The base 60 also enables the efficient handling of the service wires 38. In this regard, drop wire rings or loops 240, 242 and 244 are suspended from the lower portion of the base 60. The loop or drop wire ring 240 fits into holders 246 and 248 on the bottom of the base 60 near the edge 184, the loop 242 fits into holders 250 and 252 positioned on the middle bottom portion of the base 60 and the loop 244 hangs from or is positioned in holders 254 and 256 near the edge 180 of the base 60. By having the drop wire rings 240, 242 and 244 pivotedly suspended from the lower portion of the base 60, the service wires 38 can be easily and efficiently extended through the drop wire rings 240, 242 and 244 and through the grommet assemblies 160 and 162 positioned in the openings 152–159 on the terminal side 46 of the fixed count terminal 30. For example, the disposition of ten such service wires 38 in this manner is illustrated in FIGS. 2, 4, 9 and 16 of the drawings.

The base 60 also helps to support the barrier wall 44 and properly position the barrier wall 44 in the fixed count terminal 30. As previously indicated, the base 60 has slots 142, 144 and 146 disposed along the central raised portion 140. The slots 142, 144 and 146 are adapted to receive legs or projections 258, 260 and 262, respectively, projecting from the lower portion of the barrier wall 44. The barrier wall 44 is secured in position within the fixed count terminal 30 by screws 264 and 266 which extend through the barrier wall 44 and threadedly engage the mounting bar 42. Hence the barrier wall 44 is secured at its top portion to the mounting bar 42 by the screws 264 and 266 and is affixed in position at its lower portion by the legs 258, 260 and 262 projecting into the slots 142, 144 and 146, respectively.

The barrier wall 44 is made of appropriate insulating material and has an upper terminal module mounting section 268 and a lower terminal module mounting section 270. As particularly seen in FIGS. 8 and 14 of the drawings, the upper terminal mounting section 268 is offset from the lower terminal module mounting section 270. This enables the communication cable 32 to be properly positioned on the cable side 48 of the fixed count terminal 30 while providing sufficient room on the terminal side 46 for the extension of the service wires 38 through the grommets 160 and 162 into the interior of the fixed count terminal 30 for connection to the terminals 58.

The upper section 268 of the barrier wall 44 has a mounting lip 272 which is designed to be positioned against the mounting bar 42 and through which the screws 264 and 266 extend in order to attach the barrier wall 44 and particularly the lip 272 to the mounting bar 42. A ledge or wall section 274 extends generally perpendicularly from the lip 272 so that the upper mounting section 268 can be offset toward the terminal side 46 of the fixed count terminal 30. The upper mounting section 268 contains in its original form three knock-out portions or partitions 50b, 50d and 50c. The lower mounting section 270 has two such knock-out portions or partitions 50a and 50e. As illustrated in connection with the knock-out portion 50e in FIG. 14, each of the partitions 50a, 50b, 50c, 50d and 50e is mounted on the barrier wall 44 by leg portions 276, 278, 280 and 282 which are designed to fit into notches 284, 286, 288 and 290 respectively, located on the barrier wall 44. When it is desired to mount a terminal module, such as the terminal module 52b, on the barrier wall 44 and in this instance in the lower mounting section 270, the knock-out partition 50e is removed from the barrier wall 44 by knocking out, twisting off or cutting out the partition 50e. The legs 276, 278, 280 and 282 are specifically designed to break away from their attachment in the notches 284, 286, 288 and 290, respectively, when sufficient force is applied to the partition 50e.

Once the partition 50e has been removed from the barrier wall 44, the terminal module 52b can be positioned within an opening 292 which has been formed in the barrier wall 44 by the removal of the partition 50e. The terminal module 52b, as with respect to other terminal modules that can be mounted on the barrier wall 44, has the terminals 58 extending from one side of the terminal module 52b and the connecting wires 56 extending from the other or cable side of the terminal module 52b. Each of the connecting wires 56 is coupled within the terminal module 52b to a particular one of the terminals 58. For instance, the connecting wire 56a is coupled to the terminal 58a and the connecting wire 56b is connected or coupled to the terminal 58b. The cable side of the terminal module 52b is filled with epoxy or polyurethane resin 293 so that the connection of the connecting wires 56 to the terminals 58 will not be damaged. The terminal module 52b has legs or projections 294, 296, 298 and 300 projecting from the top portion of the terminal module 52b. Projecting legs 302 and 304 on the other hand project from the lower portion of the terminal module 52b. In addition, a connecting wire retainer 306 is also positioned on the top part of the terminal module 52b.

In order to mount the terminal modules 52a or 52b on the barrier wall 44, and as illustrated in connection with the terminal module 52b, the terminal module 52b is positioned within the opening 292 which is formed by the removal of the partition 50e. In order to position the terminal module 52b in the opening 292 the legs 294 and 296 projecting from the top of the terminal module 52b are inserted through the opening 292 so as to engage the barrier wall 44 on the cable side 48 of the barrier wall 44. In doing this, the retainer 306 is positioned within a notch 308 along the periphery of the opening 292. In addition, the legs 298 and 300 engage the barrier wall 44 on the terminal side 46. Thereafter the legs 302 and 304 on the bottom of the terminal module 52b are slid along notches 310 and 312 also disposed along the periphery of the opening 292. When the legs 302 and 304 come to the end of the notches 310 and 312, a detent projection 314 on the leg 302 abuts against the barrier wall 44 on the cable side 48 of the fixed count terminal 30. Likewise the detent portion 316 on the leg 304 abuts against the barrier wall 44. Consequently, the detent portions 314 and 316 lock the terminal module 52b into position within the opening 292. It is noted that the terminal side of the notches 310 and 312 have lip portions 317 and 318, respectively, on the terminal side of the barrier wall 44. This insures that the terminal module 52b can only be removed from the barrier wall 44 by a lineman or workman that has access to the cable side 48 of the fixed count terminal 30 by releasing the detents 314 and 316 from against the barrier wall 44. As a result, a serviceman who is working on the terminal side 46 of the fixed count terminal 30 cannot inappropriately attempt to remove the terminal module 52b from the barrier wall 44.

Once the terminal module 52b is locked in position in the opening 292, the connecting wires 56 extend from the terminal module 52b into the cable side 48 of the fixed count terminal 30 so that they can be coupled to individual ones of the telephone conductors 39 within the cable portion 36 of the communication cable 32. For instance, as illustrated in FIG. 9 with respect to connecting wire 56a, the connecting wire 56a is coupled to a particular one 319 of the conductors 39 in the cable 36 by an appropriate connector 320. As specifically seen in FIG. 9, the various ones of the connecting wires 56 extend through the retainer ring 306 prior to being coupled to the conductors 39 within the cable 36. In this manner, one of the service wires 38, for example wire 38a, may be connected to one of the conductors 39, such as the conductor 319, in the cable 36 via the terminal module 52b which acts as an interface between the service wires 38 and the conductor 39 in the cable 36. More specifically, the service wire 38a extends through the grommet assembly 162 in the opening 156. The service wire 38a then can be coupled to the terminal 58a by an appropriate fastener such as the fastener 322 shown in FIG. 14. Since the terminal 58a is coupled to the connecting wire 56a, the service wire 38a is then coupled via the terminal 58a and the connecting wire 56a to the conductor 319 in the cable 36 by the connector 320.

As is evident from the drawings and particularly FIGS. 4 and 9, the fixed count terminal 30 and particularly the barrier wall 44 within the fixed count terminal 30 is capable of mounting five terminal modules such as the terminal modules 52a and 52b in the openings that are formed by the removal of the partitions 50a, 50b, 50c, 50d and/or 50e from the barrier wall 44. Since each of the terminal modules 52a or 52b contains ten terminals 58 and associated connecting wires 56, the fixed count terminal 30 is capable of connecting fifty individual service wires 38 to the conductors 39 in the cable 36 or twenty-five pairs of such individual service wires 38. Hence, the fixed count terminal 30 is referred to as a twenty-five pair fixed count aerial terminal.

In order to enclose the connections made from the service wires 38 to the telephone conductors 39 in the cable 36 and thereby to protect the connections from the environment, the fixed count terminal 30 includes the covers 62 and 64. The cable side cover 62 is hingedly mounted on the base 60 by the hinge assembly 168 including the knuckle portions 166 extending from the edge 165 of the cable side base portion 164 and the knuckle portions 172 on the cover 62. The knuckle portions 172 interfit with the knuckle portions 166 so that a hinge pin 324 may be inserted through the knuckle portions 166 and 172. The pin 324 has a leg portion 326 projecting perpendicularly from the pin 324 and is lodged within a pin holder 327 located along the edge 184 of the base 60. In this manner the pin 324 is maintained in position with respect to the base 60 and the cover 62 may be swung about the pin 324 either to its closed position as for instance shown in FIG. 1 of the drawings or to its open position as shown in FIG. 16 of the drawings.

The cover 62 is generally arcuate or bulging in shape (see for instance FIG. 12 of the drawings). Since the cover 62 is so shaped it not only provides room within the fixed count terminal 30 for the various connections and conductors, but also provides a rounded outside configuration to minimize disturbance by wind or the like on the fixed count terminal 30 when the cover 62 is in its closed position. The cover 62 contains slots 328 and 330 at opposite ends. These slots 328 and 330 are designed to engage the upstanding walls 198 and 214, respectively, of the nozzles 66 and 67 when the cover 62 is placed in its closed position. In order to maintain the cover 62 in its closed position recesses 332 and 334 are formed within the cover 62 near a top 336 portion of the cover 62. The recess 332 is adapted to receive a fastener 338 which extends through the recess 332 and the barrier wall 44 into the mounting bar 42 and threadedly engages the mounting bar 42. Similarly, a fastener 340 fits into the recess 334 and is threadedly engaged into the mounting bar 42 after extending through the barrier wall 44. When the fasteners 338 and 340 are so affixed to the mounting bar 42, the cover 62 is maintained in its closed position as shown in FIG. 1 of the drawings.

The recesses 332 and 334 are provided in the cover 62 so as to prevent unauthorized removal of the screws 338 and 340 by personnel who do not have the right type of tool to remove these screws 338 and 340 from their engagement with the mounting bar 42. This is particularly helpful so that a serviceman would be less likely to use a substitute tool such as a long-nose pliers to attempt to gain access to the cable side 48 of the fixed count terminal 30.

Along the top portion 336 of the cover 62 are a pair of toggle latch receiving or strike portions 342 and 344. These latch portions 342 and 344 enable the terminal side cover 64 to be maintained in its closed position as will be hereinafter explained. The top portion 336 of the cover 62 also has a groove 346 and a tongue portion 348 which enable the top portion 336 of the cover 62 to be in sealing relation with the cover 64 when both the covers 62 and 64 are in their closed position.

The terminal side cover 64 is also hingedly mounted on the base 60 by a hinge assembly 150 including knuckle portions 151 projecting from the side 149 of the base 60 and knuckle portions 170 on the terminal side cover 64. A hinge pin 350 projects through the knuckle portions 151 and 170 and is held in position by a pin holder 352 positioned along the side edge 184 of the base 60 adjacent the ledge 194. The cover 64 is thus able to swing about the pin 350 to an open position as shown in FIG. 16 or to a closed position as, for instance, shown in FIGS. 1 and 2. As was the case with respect to the cover 62, the cover 64 is generally rounded or arcuate in shape so as to bulge outwardly from the interior of the fixed count terminal 30 to provide the most room within the fixed count terminal 30 for connection of the service wires 38 to the terminals 58 located on the terminal side 46 of the fixed count terminal 30. The cover 64 has slots 354 and 356 at opposite ends which receive the upstanding walls 198 and 214 on the nozzles 66 and 67 respectively when the cover 64 is swung to its closed position. Consequently, the interfitting of the wall 198 into the slot 328 on the cable side cover 62 and the positioning of the wall 198 in the slot 354 on the terminal side cover 64 results in the opening at the end 184 of the base 60 formed between the closed terminal side cover 64 and the cable side cover 62 to be essentially sealed by the entrance nozzle 66. Likewise, by having the upstanding wall 214 fit within the slot 330 on the cable side cover 62 and the slot 356 on the terminal side cover 64, the upstanding wall 214 essentially seals or closes off the opening formed between the closed terminal side cover 64 and the cable side cover 62 near the end 180 of the base 60.

Near the top portion 358 of the terminal side cover 64 are toggle latches 360 and 362. The latch 360 includes a latch mechanism 364 which is attached to the terminal side cover 64 by a toggle latch anchor 365 and which is designed to fit about the latch strike 342 on the cable side cover 62 so as to be secured therein. Likewise, toggle latch 362 has a toggle latch mechanism 366 which is affixed to the terminal side cover 62 by an anchor 367 and which fits about the latch strike 344 on the cable side cover 62 so as to be secured therein. When the latch mechanisms 364 and 366 are engaged with the latch strikes 342 and 344, respectively, the side cover 64 is maintained in its closed position. In such a position a tongue 368 is positioned within the groove 346 on the cable side cover 62 and the tongue 348 on the cover 62 is positioned within a groove 370 along the top 358 of the cover 64. A neoprene tubing 380 is wedged in the groove 346 of the cable side cover 62 and is compressed by the tongue 368 when the tongue 368 is positioned within the groove 346. Consequently, the matching of the covers 62 and 64 by the tongues 368 and 348 and the grooves 370 and 346 enable the top portion of the fixed count terminal 30 to be sealed by the neoprene tubing 380.

It is noted in regard to the manner in which the covers 62 and 64 are maintained in their closed position that the terminal side cover 64 can be opened by merely releasing the latch mechanisms 364 and 366 from the latch strikes 342 and 344 positioned on the cable side cover 62. On the other hand, the cable side cover 62 can only be opened when not only the latch mechanisms 364 and 366 are so released but also when the screws 338 and 340 are unfastened from the mounting bar 42. Consequently, a serviceman need only to open the terminal side cover 64 when working on the connections of the service wires 38 to the terminals 58 and does not need to open the cable side cover 62 which should only be opened by authorized personnel.

As previously referred to, the fixed count terminal 30 is also adaptable to mount a branch cable such as the branch cable 382 shown in FIG. 18 of the drawings. The branch cable is similar to the cable portion 36 of the communication cable 32 in that it has an outer insulating sheath 384, an inner metallic shield 386 and a core of telephone conductors 388. Normally, the number of conductors 388 is less than the number of conductors 39 in the cable 36. Various ones of the conductors 388 can be coupled to various ones of the connecting wires 56 or to various ones of the conductors 39 in the cable 36 by appropriate connectors such as the connector 320 used with respect to the connecting wires 56. In order to mount the branch cable 382 in the branch holding portion 132 on the clamp bracket 70 or the branch holding portion 136 on the clamp bracket 72, a shield bonding clamp 390 is used. The shield bonding clamp 390 has an inner plate 392 which is slid between the inner metallic shield 386 and the core of conductors 388 of the branch cable 382 and has a threaded stud 394 extending from it. The stud 394 projects through the inner metallic shield 386, the sheath 384 and an outer plate 396. A nut 398 secures the outer plate 396 in position by securing the stud 394 to a Z-bracket 400. If, for instance, the branch cable 382 is to be positioned within the holding portion 136 of the clamp bracket 72 and as shown in FIGS. 17 and 18 of the drawings, the stud 394 is affixed to the auxiliary Z-bracket 400 by having it extend through a lower portion of the Z-bracket 400 and affixed thereto by the nut 398. The upper portion of the Z-bracket 400 has a notch 404 which is designed to fit onto the fastener 112 which also attaches the Z-bracket 104 to the midsection 110 of the clamp bracket 72. As can be appreciated from particularly FIG. 17 of the drawings, the fastener 112 need not be completely removed from the clamp bracket 72 in order to properly position the auxiliary Z-bracket 400 because the open notch 404 in the auxiliary z-bracket 400 enables the auxiliary Z-bracket 400 to be slipped onto the fastener 112 when the fastener 112 is loosened.

When the branch cable, such as the cable 382, is to be extended into the fixed count terminal 30 through the nozzle 66, the nozzle 66 must be replaced with a double entrance branch nozzle which has a funnel-shaped portion below the nose portion 196 so as to permit the entrance of the branch cable 382 into the fixed count terminal 30. The branch cable, such as the branch cable 382, can also be similarly affixed to the clamp bracket 70. In such a case, the nozzle 67 has to be replaced with a double entrance branch nozzle.

Although the present invention is described with respect to several illustrative embodiments thereof, it should be understood that numerous other modifications and embodiments of the invention can be devised by those skilled in the art that will fall within the spirit and scope of the principles of this invention.

What is claimed as new and desired to be secured by Letters Patent of the United States is:

1. A combination of a cable terminal and a communication cable having a support strand portion and a cable conductor portion, said combination comprising:
   a base means,
   a support means affixed to said support strand portion of said cable and to which said base means is affixed,
   a wall means supported by said support means and said base means, said wall means dividing said terminal into a cable compartment in which said communication cable including said support strand portion and said cable conductor portion is disposed and a terminal compartment, and
   terminal means mounted on said wall means and extending into said terminal compartment.

2. The combination as set forth in claim 1 wherein said wall means has a portion offset toward said terminal compartment so as to provide additional space for the location of said communication cable in said cable compartment.

3. The combination as set forth in claim 1 including first cover means hingedly mounted to said base means to substantially enclose said cable compartment and second cover means hingedly mounted to said base means to substantially enclose said terminal compartment.

4. The combination as set forth in claim 1 wherein said terminal means has a terminal side from which extends a plurality of terminals and a cable side from which extends a plurality of connecting means, each of said connecting means being coupled to a particular one of said plurality of terminals.

5. The combination as set forth in claim 1 wherein said wall means has projections extending into recesses in said base means.

6. A combination of a cable terminal and a communication cable having a plurality of conductors, said combination comprising:
   a base means,
   a support means affixed to said cable,
   a wall means supported by said support means and said base means, said wall means having a plurality of openings, at least one of said plurality of openings being substantially closed by a removable means disposed in said opening, said removable means being mounted in said opening by breakable leg means attached to said wall means about the periphery of said opening, and
   terminal means mounted on said wall means in at least another of said plurality of openings.

7. The combination as set forth in claim 6 wherein said wall means divides said terminal into a cable compartment in which said communication cable is disposed and a terminal compartment, and said terminal means includes a terminal module having projections extending therefrom positioning said terminal module in its opening, said terminal module being removable from its opening only from said cable compartment side of said wall means.

8. The combination as set forth in claim 7 wherein said opening in which said terminal module is positioned has notches positioned about the periphery thereof and wherein said projections include first leg means extending from said terminal module along one edge and fitting about said wall means and second leg means which are disposed in said notches to secure said terminal module in its opening.

9. The combination as set forth in claim 8 wherein said notches have lip means about the outer edge of the notches.

10. A cable terminal for use with a communication cable having a plurality of conductors, said cable terminal comprising:
    a base means,
    a support means to be affixed to said cable,
    a wall means supported by said support means and said base means, said wall means having at least one opening, and
    terminal means mounted on said wall means, said terminal means having a terminal side from which extends a plurality of terminals and a cable side from which extends a plurality of connecting means consisting of a plurality of connecting wires extending through a retainer ring projecting from said terminal means, each of said connecting wires being coupled to a particular one of said plurality of terminals and each of said connecting wires being adapted to be connected to an individual one of the plurality of conductors within the communication cable.

11. A combination of a terminal and a communication cable, said combination comprising:
    a base means,
    a support means to which said cable is affixed,
    first cover means hingedly mounted along one edge of said base means and having opened and closed positions, said first cover means having first engaging means,
    second cover means hingedly mounted along an opposite edge of said base means and having opened and closed positions, said second cover means having second engaging means intermeshing with said first engaging means when said first and second cover means are both in said closed positions,
    securing means to maintain said first cover means in said closed position, and
    latch means to maintain said second cover means in said closed position.

12. The combination as set forth in claim 11 wherein said first and second cover means have a bulging outwardly, rounded shape.

13. The combination as set forth in claim 11 wherein said latch means includes a latch extending from said second cover means and is secured to a latch mechanism on said first cover means.

14. The combination as set forth in claim 11 including seal means disposed between said first and second engaging means.

15. The combination as set forth in claim 11 including nozzle means disposed on said base means and positioned between said first and second cover means when said first and second cover means are in said closed position.

16. A combination of a terminal and a communication cable, said combination comprising:
    a base means,
    a support means to which said cable is affixed,
    first cover means hingedly mounted along one edge of said base means and having opened and closed positions, said first cover means being hinged to said base means by first hinge means, said first hinge means including first base hinge means along a first edge of said base means and having first cover hinge means along a first edge of said first cover means, said first base hinge means and said first cover hinge means having first openings therebetween to provide first openings into said terminal through said base means,
    second cover means hingedly mounted along an opposite edge of said base means and having opened and closed positions,
    securing means to maintain said first cover means in said closed position, and
    latch means to maintain said second cover means in said closed position.

17. The combination as set forth in claim 16 wherein said second cover means is hinged to said base means by second hinge means, said second hinge means including second base hinge means along a second edge of said base means and having second cover hinge means along a second edge of said second cover means, said second base hinge means and said second cover hinge means having second openings therebetween to provide second openings into said terminal through said base means.

18. A combination of a terminal and a communication cable, said combination comprising:
    a base means,
    a support means to which said cable is affixed,
    first cover means hingedly mounted along one edge of said base means and having opened and closed positions, said first cover means having first engaging means,
    second cover means hingedly mounted along an opposite edge of said base means and having opened and closed positions, said second cover means having second engaging means intermeshing with said first engaging means when said first and second cover means are both in said closed positions, securing means to maintain said first cover means in said closed position, said securing means including a fastener means securing said first cover means to said support means, said fastener means being disposed through recess means in said first cover means, and latch means to maintain said second cover means in said closed position.

19. A combination of a cable terminal, a portion of a communication cable having a plurality of cable conductors, and a plurality of wires extending into said cable terminal, said combination comprising:

a support means to which said cable is secured, a wall means attached to said support means, a base attached to said support means and having disposed thereon said wall means, terminal means disposed on said wall means and having a plurality of terminals, at least of one said plurality of cable conductors being coupled to at least one of said plurality of terminals on one side of said wall means and at least one of said wires being coupled to at least one of said terminals on the other side of said wall means, and cover means attached to said base.

20. The combination as set forth in claim 19 wherein a plurality of terminal means are disposed on said wall means.

21. The combination as set forth in claim 20 wherein up to five terminal means are disposed on said wall means.

22. The combination as set forth in claim 19 wherein said base has a plurality of openings through which said plurality of wires extends, said plurality of openings being positioned on the other side of said wall means.

23. The combination as set forth in claim 22 wherein each of said openings has a grommet disposed therein.

24. The combination as set forth in claim 19 wherein said base has a plurality of wire rings extending therefrom through which wire rings said wires extend.

25. A combination of a cable terminal, a communication cable having a plurality of first wires, and a plurality of second wires extending into the cable terminal, said combination comprising:

a base having a central portion with recess means, a barrier having projection means disposed in said recess means, said barrier separating said cable terminal into first and second sections, a support means affixed to said cable and having affixed thereto said barrier and said base, said support means positioning said cable in said first section of said cable terminal, a first cover means hingedly connected to said base in said first section, and a second cover means hingedly connected to said base in said second section of said cable terminal.

26. The combination as set forth in claim 25, wherein said central portion of said base is raised from said base and said support means has notches therein to fit about said raised central portion of said base, said support means being affixed to said central raised portion of said base.

27. The combination as set forth in claim 25, wherein said base has a plurality of openings in said second section, said plurality of second wires extending through said openings.

28. The combination as set forth in claim 25, including terminal means supported on said barrier, said terminal means connecting said plurality of first wires to said plurality of second wires.

29. A cable terminal for use with an insulated conductor cable, said cable terminal comprising:

a base means having first and second base hinge means along opposite elongated edges of said base means and having a central portion, said base means being sloped from said central portion toward said first and second base hinge means, first cover means having a first cover hinge means, first pin means cooperating with said first base hinge means and said first cover hinge means to hingedly mount said first cover means on said base means, said first base hinge means and said first cover hinge means having first openings therebetween to provide first openings into said terminal through said base means, second cover means having second cover hinge means, and second pin means cooperating with said second base hinge means and said second cover hinge means to hingedly mount said second cover means on said base means, said second base hinge means and said second cover hinge means having second openings therebetween to provide second openings into said terminal through said base means.

30. A cable terminal as set forth in claim 29 wherein said first and second cover means have bulging outward walls such that the cable terminal has a generally outwardly rounded shape when said first and second cover means are in a closed position.

31. A combination of a cable terminal and a communication cable having a support strand portion and a cable conductor portion, said combination comprising:

a base means, a wall means dividing said cable terminal into first and second sections, a mounting bar extending over a portion of said communication cable positioned within said cable terminal, first and second clamp bracket means attached to said mounting bar and having said support strand portion attached thereto, said first clamp bracket means being attached to said mounting bar at one end thereof and said second clamp bracket means being attached to said mounting bar at the other end thereof, a first generally Z-shaped bracket means attached to said first clamp bracket means positioning said cable conductor portion relative to said first clamp bracket means, and a second generally Z-shaped bracket means attached to said second clamp bracket means positioning said cable conductor portion relative to said second clamp bracket means.

32. The combination as set forth in claim 31, including a first clamp means attaching said support strand portion to said first clamp bracket means and a second clamp means attaching said support strand portion to said second clamp bracket means.

33. The combination as set forth in claim 31 wherein said first clamp bracket means includes a first cable receiving portion in which said cable conductor portion is positioned by said first generally Z-shaped bracket means and said second clamp bracket means includes a second cable receiving portion in which said cable conductor portion is positioned by said second generally Z-shaped bracket means.

34. The combination as set forth in claim 31, wherein said first generally Z-shaped bracket means is attached to said first clamp bracket means by a first fastening means and wherein said second generally Z-shaped bracket means is attached to said second clamp bracket means by a second fastening means, said first fastening means enabling said first generally Z-shaped bracket means to be adjustably mounted on said first clamp bracket means and said second fastening means enabling said second generally Z-shaped bracket means to be adjustably mounted on said second clamp bracket means.

35. The combination as set forth in claim 34, wherein said first fastening means extends through one leg portion of said first generally Z-shaped bracket means and said second fastening means extends through one leg portion of said second generally Z-shaped bracket means.

36. The combination as set forth in claim 31, including a tension bar coupled across said first and second generally Z-shaped bracket means.

37. The combination as set forth in claim 36, wherein said tension bar has a first slot adjacent one end thereof through which extends a first fastening means attaching said tension bar to said first generally Z-shaped bracket means and said tension bar has a notch in the other end thereof through which is extended a second fastening means connecting said tension bar to said second generally Z-shaped bracket means.

38. The combination as set forth in claim 31, wherein said base means is attached to said first and second clamp bracket means and said wall means is affixed to said mounting bar.

39. The combination as set forth in claim 31, including a first cover means hingedly mounted to said base means and a second cover means hingedly mounted to said base means, at least one of said first and second cover means being secured in a closed position by a fastening means extending into said mounting bar.

40. A combination of a cable terminal and a communication cable having a support strand portion and cable conductor portion with an inner core of conductors surrounded by a shield means, said combination comprising:
a base means,
a wall means positioned on said base means,
a first clamp bracket means mounted on said base means and having a first cable receiving portion,
a second clamp bracket means mounted on said base means and having a second cable receiving portion,
a mounting bar extending over a portion of said communication cable positioned within said cable terminal and connected to said first and second clamp bracket means,
a first generally Z-shaped bracket means adjustably attached to said first clamp bracket means and positioning said cable conductor portion in said first cable receiving portion,
a second generally Z-shaped bracket means adjustably attached to said second clamp bracket means and positioning said cable conductor portion in said second cable receiving portion,
a first shield clamp means coupled to said shield means and having a first shield fastening means extending therefrom, said first shield fastening means being coupled to said first generally Z-shaped bracket means, and
a second shield clamp means coupled to said shield means and having a second shield fastening means extending therefrom, said second shield fastening means being coupled to said second generally Z-shaped bracket means.

41. The combination as set forth in claim 40, including a tension bar connected to said first and second shield fastening means so as to be coupled to said shield means and to said first and second generally Z-shaped bracket means.

42. A combination of a cable terminal, first and second cable conductor portions and a support strand, said combination comprising:
a base means,
a wall means mounted relative to said base means,
a first clamp bracket means attached to said support strand, said first clamp bracket means having a first cable receiving portion and a first auxiliary cable receiving portion,
a second clamp bracket means attached to said support strand, said second clamp bracket means having a second cable receiving portion,
a first generally Z-shaped bracket means positioning said first cable conductor portion in said first cable receiving portion and a second generally Z-shaped bracket means positioning said first cable conductor portion in said second cable receiving portion, and
an auxiliary generally Z-shaped bracket means attached to said first generally Z-shaped bracket means and to said first clamp bracket means to position said second cable conductor portion in said first auxiliary cable receiving portion.

43. The combination as set forth in claim 42, wherein said second clamp bracket means has a second auxiliary cable receiving portion.

44. The combination as set forth in claim 42, wherein said first generally Z-shaped bracket means is attached to said first clamp bracket means by a first fastening means and said auxiliary generally Z-shaped bracket means is attached to said first generally Z-shaped bracket means and said first clamp bracket means by said first fastening means.

45. The combination as set forth in claim 44, wherein said auxiliary generally Z-shaped bracket means has a notch at one end to fit about said first fastening means and to permit the attachment of said auxiliary generally Z-shaped bracket means to said first fastening means without removing said first fastening means.

46. The combination as set forth in claim 42 wherein said first cable conductor portion includes a first inner core of conductors surrounded by a first shield means, and including a first shield clamp means coupled to said first shield means and having a first shield fastening means extending therefrom, said first shield fastening means being coupled to said first generally Z-shaped bracket means.

47. The combination as set forth in claim 46 wherein said second cable conductor portion includes a second inner core of conductors surrounded by a second shield means, and including a second shield clamp means coupled to said second shield means and having a second shield fastening means extending therefrom, said second shield fastening means being coupled to said auxiliary generally Z-shaped bracket means.

* * * * *